United States Patent [19]

Hon et al.

[11] 4,178,561

[45] Dec. 11, 1979

[54] SCANNING ARRANGEMENTS FOR OPTICAL FREQUENCY CONVERTERS

[75] Inventors: David T. Hon, Los Angeles; Hans W. Bruesselbach, Santa Monica; Alexander R. Muir, Playa Del Rey; Harold J. Tuchnyer, Pacific Palisades, all of Calif.

[73] Assignee: Hughes Aircraft Company, Culver City, Calif.

[21] Appl. No.: 947,915

[22] Filed: Oct. 2, 1978

[51] Int. Cl.² .............................................. G02B 27/17
[52] U.S. Cl. .................................................... 350/6.6
[58] Field of Search ................................. 350/6.1-6.91

[56] References Cited
U.S. PATENT DOCUMENTS

3,530,301  9/1970  Boyd et al. ............................ 307/427

Primary Examiner—Jon W. Henry
Attorney, Agent, or Firm—Paul M. Coble; W. H. MacAllister

[57] ABSTRACT

Arrangements are disclosed for reciprocatively scanning a focused laser beam across an optical frequency converting crystal while deriving an output laser beam at the converted frequency along a stationary path. An effective elongated illumination pattern is provided for the crystal which reduces thermal gradients across the crystal, while the beam density at the crystal is sufficiently large so that high conversion efficiency may be realized.

12 Claims, 6 Drawing Figures

SCANNING ARRANGEMENTS FOR OPTICAL FREQUENCY CONVERTERS

BACKGROUND OF THE INVENTION

1. Field of the Invention

This invention relates generally to optical frequency conversion, and more particularly, it relates to arrangements for scanning an optical beam across an optical frequency converting medium to increase conversion efficiency.

2. Description of the Prior Art Including Prior Art Statement

Optical frequency conversion can be achieved by passing a light beam through an electro-optic crystal which develops light beam components at frequencies related to the frequency of the input beam in accordance with a parametric interaction process in the crystal. Maximum conversion of energy to the desired frequency occurs when the sum of the momentum vectors of all of the light waves participating in the parametric interaction process equals zero, a condition commonly referred to as the phase-match condition.

Optical frequency converting devices are finding increased use in a number of laser systems wherein there is a need to change the frequency of the originally generated laser beam. However, such devices are severely limited in their average power handling capabilities by thermal effects in the frequency-converting crystals. One undesirable thermal effect is that as the laser beam passes through the crystal, a portion of the laser energy is absorbed by the crystal to produce a temperature gradient across the crystal. Since the aforementioned phase-match condition is a function of the temperature of the crystal, temperature gradients across the crystal can make it impossible to obtain reasonably uniform phase-matching throughout the regions of the crystal traversed by the beam. Such mismatches can result in a significant reduction in the frequency conversion efficiency of the crystal as the average power level of the input beam increases.

In the past, the conversion efficiency of optical parametric crystals has been increased by passing the input light beam through cylindrical lenses to reshape the beam into a beam of elongated cross-section which impinges upon the crystal in an elongated illumination pattern. Such an illumination pattern reduces the temperature differential across the crystal, thereby achieving more uniform phase-matching across the crystal. Further details concerning the use of beam-shaping cylindrical lenses to increase the efficiency of optical frequency doublers are described in the paper "Effect of Laser and Medium Parameters on Second-Harmonic Generation," by V. D. Volosov, *Soviet Physics—Technical Physics*, Vol. 14, No. 12 (June 1970), pp. 1652-1658. Further discussions of the use of beam-shaping to reduce thermal gradients in optical frequency doubling crystals are found in the papers "High Average Power Frequency Doubling for Dye Laser Pumping," by D. T. Hon et al, *Proceedings of the Society of Photo-Optical Instrumentation Engineers*, Vol. 122 (Aug. 25-26, 1977), pp. 95-99; and "Average Power Breakthrough in Nonlinear Process in Crystals," by D. T. Hon, *IEEE Journal of Quantum Electronics*, Vol. QE-13, No. 9 (September 1977), pp. 99D-100D.

As the average power level of the light beam applied to the parametric crystal is increased (by using higher average power lasers or pulsed lasers operating at higher pulse repetition frequencies, for example), it becomes difficult to achieve high conversion efficiency when lenses are employed to shape the beam illumination pattern on the crystal. This is due to the fact that as the beam cross-section is made more elongated to reduce thermal gradients in the crystal, the power density of the beam is reduced, thereby reducing conversion efficiency. The beam power density may be increased by using beams of higher peak power levels. Nevertheless, a limit is imposed on the ratio of beam average power to peak power for which high efficiency parametric frequency conversion can be achieved using the prior art.

SUMMARY OF THE INVENTION

It is an object of the present invention to provide an arrangement for achieving high efficiency parametric frequency conversion with light beams of higher average power levels than heretofore has been possible for a given peak power level.

It is a further object of the invention to provide an arrangement for achieving high efficiency parametric frequency conversion with light beams of lower peak power levels than heretofore has been possible for a given average power level.

A frequency converting arrangement according to the invention utilizes an optical signal converting medium having an input surface and an output surface for developing from a light beam at a first frequency incident upon the input surface a light beam at a second frequency emerging from the output surface. An input light beam at the first frequency is directed toward the input surface of the signal converting medium while the beam is converged to a portion of reduced cross-section at the signal converting medium. Relative movement is produced between the reduced cross-section portion of the beam and the signal converting medium such that this portion of the beam is caused to effectively reciprocatively scan the input surface of the signal converting medium while an output light beam at the second frequency is provided along a stationary path.

Additional objects, advantages and characteristic features of the invention will become readily apparent from the following detailed description of preferred embodiments of the invention when considered in conjunction with the accompanying drawing.

DESCRIPTION OF THE PREFERRED EMBODIMENTS

Figure 1:
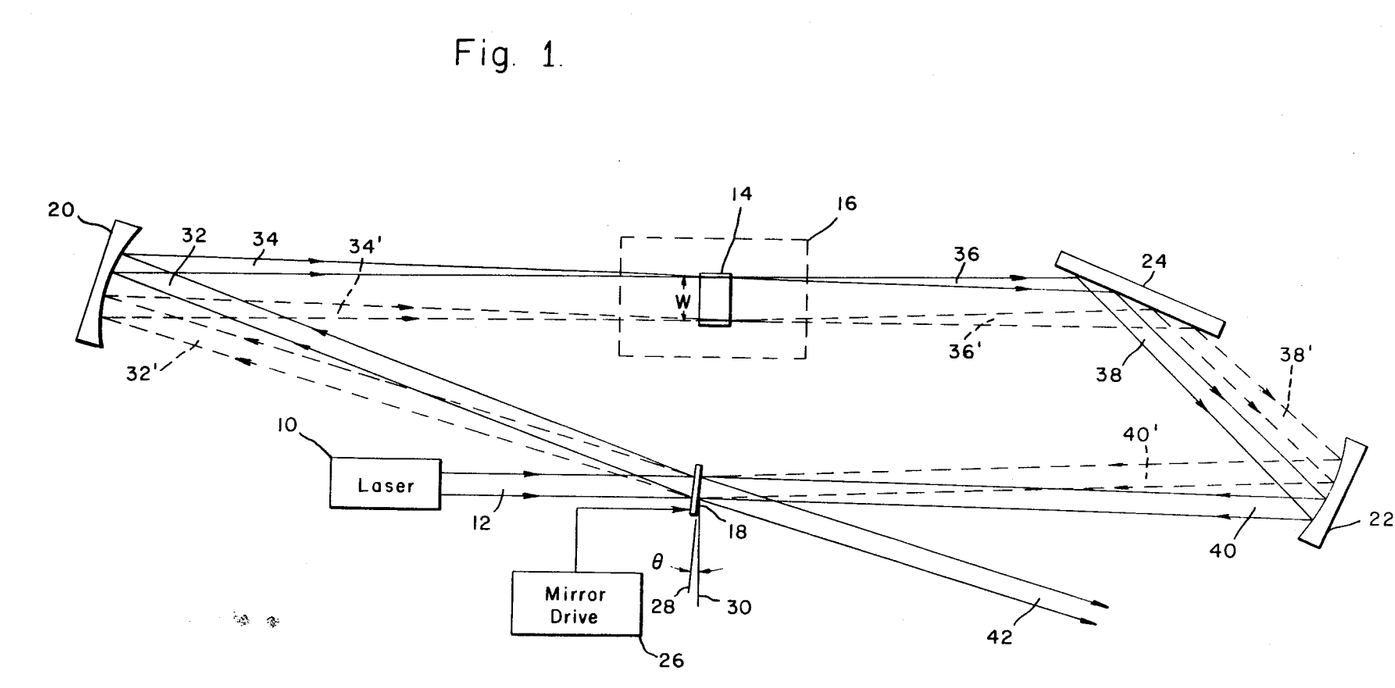
FIG. 1 is a schematic illustration of a scanning arrangement according to one embodiment of the invention.

Referring to FIG. 1 with greater particularity, there is shown a laser 10 for generating a laser beam 12 to be applied to an optical signal converting medium 14 which develops from the beam 12 an output laser beam at a different frequency from that of the beam 12. The medium 14 may be a parametric signal converting medium such as an electro-optic crystal which develops an output beam at a frequency parametrically related to the frequency of the beam applied thereto. For purposes of illustration, the arrangement of FIG. 1 will be described with specific reference to parametric frequency doubling; however, it should be understood that the principles of the invention are applicable to other forms of frequency coversion as well. For example, the medium 14 may be a laser medium such as an organic dye pumped by the laser beam 12 which generates a new laser beam at a desired frequency.

In a specific exemplary frequency doubling arrangement which may be constructed according to the invention, the laser 10 may be a cw-pumped, Q-switched Nd:YAG laser providing a laser beam 12 having a wavelength of about 1.06 μm, although it should be understood that light beams of other wavelengths and generated by other means are also suitable. Examples of specific crystal materials which may be employed to double the frequency of a 1.06 μm laser beam (and thereby provide an output beam having a wavelength of about 0.53 μm) are deuterated cesium dihydrogen arsenate (CD*A), lithium niobate ($LiNbO_3$), and barium sodium niobate ($Ba_2NaNb_5O_{15}$), although other crystal materials may be used instead. Also, the crystal 14 may be either a single crystal or a composite crystal formed from a plurality of contiguously disposed individual crystals (possibly cut from the same boule). In order to insure that maxium conversion efficiency occurs, the crystal 14 must be maintained at the proper temperature, and for this purpose is housed in an oven shown by dashed rectangle 16. The appropriate operating temperature for maximum efficiency frequency doubling of 1.06 μm radiation in a lithium-rich lithium niobate crystal is 160° C.

In accordance with the present invention, high conversion efficiency with reduced thermal gradients across the crystal 14 are achieved by focusing the input laser beam 12 into a reduced cross-section, or waist, portion at the crystal 14 while reciprocatively scanning the waist portion of the beam across the input surface of the crystal 14. This beam focusing and scanning is accomplished by means of a reflector array which also processes the beam emerging from the crystal 14 so as to provide a stationary output beam from the array.

In the embodiment shown in FIG. 1, the focusing and scanning reflector array includes a scanning mirror 18 provided with both front and back reflective surfaces disposed in the path of the input laser beam 12 near the crystal 14. The scanning mirror 18 is located in the confocal plane of first and second focusing mirrors 20 and 22, respectively, disposed on opposite sides of the crystal 14 and having respective concave reflective surfaces facing the crystal 14 and the scanning mirror 18. The concave reflective surfaces of the respective mirrors 20 and 22 may be spherical segments having the same radius of curvature (focal length). An elongated beam-deflecting flat mirror 24 is disposed optically between the crystal 14 and the second focusing mirror 22. A galvanometer-type mirror drive 26, responsive to a triangular electrical input signal, rotates the scanning mirror 18 in an oscillatory manner over a small angle θ between the limits shown by lines 28 and 30 in FIG. 1.

In the operation of the arrangement of FIG. 1, when the scanning mirror 18 is in the position shown, i.e., with its relative surfaces parallel to line 28, the input laser beam 12 is caused to propagate through the arrangement along the path shown in arrowed solid line. More specifically, the input laser beam 12 is reflected by the front surface of scanning mirror 18 along path 32 toward first focusing mirror 20 from which it is reflected along a converging path 34 toward the crystal 14 near one extremity of its width. After passing through the crystal 14, the beam travels along a diverging path 36 toward flat mirror 24 from which it is reflected along path 38 toward the second focusing mirror 22. This beam is then reflected by mirror 22 along a path 40 toward the back surface of scanning mirror 18 from which it is reflected to provide an output beam along path 42.

When the scanning mirror 18 has been moved to the position in which its reflective surfaces are parallel to line 30, the laser beam 12 is caused to travel through the arrangement along the path shown in arrowed dashed line. More specifically, the beam 12 is reflected by the front surface of scanning mirror 18 along path 32' toward the first focusing mirror 20 from which it is reflected along converging path 34' toward the crystal 14 near the opposite extremity of its width. After passing through the crystal 14, the beam travels along diverging path 36' toward flat mirror 24 from which it is reflected along path 38' toward the second focusing mirror 22. The beam is then reflected from mirror 22 along path 40' toward the portion of the back surface of the scanning mirror 18 coincident with the portion which previously received the beam along path 40. The beam incident upon the back surface of scanning mirror 18 is then reflected along stationary output path 42.

It may be seen that as the scanning mirror 18 is rotated through the angle θ between lines 28 and 30, the path of the input laser beam 12 through the arrangement is caused to vary between the respective paths shown in arrowed solid line and arrowed dashed line. As a result, the beam is caused to reciprocatively scan the surface of the crystal 14 facing the mirror 20 to effectively provide an elongated illumination pattern for the crystal 14 which reduces thermal gradients across the crystal 14. At the same time, since the beam impinging upon the crystal 14 has been focused to its waist portion of reduced across-section, the beam density is sufficiently large so that high conversion efficiency may be realized. After emerging from the crystal 14, the moving beam is "descanned" to produce an output beam along stationary path 42.

An arrangement according to FIG. 1 may be constructed using the following design criteria. First, a neutral design position is assumed for the scanning mirror 18 such that it is oriented halfway between the lines 28 and 30. In this position, a light ray path through the system is assumed to intersect all components at their centers. Each of the focusing mirrors 20 and 22 are constructed with the same focal length f, with the scanning mirror 18 located in the common focal plane of the mirrors 20 and 22, i.e., at a distance f from each of the mirrors 20 and 22. The center of the crystal 14 is also located at the focal distance f from the mirror 20. In order to minimize aberrations, the angles of incidence of the light beam onto the reflective surfaces of the mirrors 20 and 22 (measured with respect to the normal thereto) should be minimized. Thus, the scanning mirror 18 should be located at a position as close as possible to the crystal 14 which will still insure that the beam path 32 which passes nearest to the oven 16 will not intersect the oven 16.

The first mirror 20 should be oriented such that light reflected from the center of the mirror 20 will impinge upon the center of the surface of the crystal 14 facing the mirror 20 along a direction perpendicular to this surface. The flat mirror 24 and the second focusing mirror 22 are oriented such that light emerging from the center of the surface of crystal 14 facing the mirror 24 is reflected from the respective centers of the mirrors 24 and 22 toward the center of the surface of scanning mirror 18 facing the mirror 22. Moreover, in order to minimize aberrations, it is desirable to use a flat mirror 24 having a long reflective surface so as to reduce the angles of incidence of light on the focusing mirror 22. It is further pointed out that the optical path from the crystal 14 to the scanning mirror 18 via the mirrors 24 and 22 is slightly longer than that from the scanning mirror 18 to the crystal 14 via the mirror 20, and as a result, the output beam from the scanning mirror 18 along path 42 converges slightly as shown in FIG. 1. However, a parallel output beam may be obtained, if desired, by providing a suitable lens in the path 42.

The design of a scanning arrangement according to FIG. 1 will now be discussed for an input laser beam 12 having an average power P, an initial diameter $\tau_o$, an initial peak power density $\rho_o$ and an intrinsic beam divergence $\phi_o$. However, as the beam is focused to its waist diameter $\tau$ at the crystal 14, its peak power density is increased to the value $\rho$ and its beam divergence is increased to the value $\phi$ in accordance with the relation:

$$(\rho/\rho_o) = (\phi/\phi_o) = (\tau_o/\tau). \quad (1)$$

The necessary scan width W (measured in cm) of the beam across the input surface of the crystal 14 may be determined from:

$$W \geq P\eta\tau/8K\delta T, \quad (2)$$

where P is the average power of the input laser beam 12 (measured in watts), $\eta$ is the absoption coefficient of the crystal 14 (measured in cm$^{-1}$), $\tau$ is the diameter of the waist portion of the beam at the crystal 14 (measured in cm), K is the thermal conductivity of the crystal 14 (measured in watts per cm−°C.), and $\delta T$ is the acceptance temperature of the crystal 14 defined as the full-width, half-magnitude (FWHM) of the characteristic representing the output power from the crystal 14 at the desired frequency as a function of temperature (measured in °C.).

The width of the crystal 14 should be slightly greater than the scan width W, while the lateral extent of the scanning mirror 18 need only be slightly greater than the initial diameter $\tau_o$ of the beam 12. The lateral extent of the mirrors 20, 22 and 24 should be such that the respective projections of their reflective surfaces in a plane parallel to the input and output surfaces of crystal 14 are each slightly greater than the sum of the scan width W and the initial beam diameter $\tau_o$. All of the components 14, 18, 20, 22 and 24 need only a height, i.e., extent along a direction perpendicular to the plane of FIG. 1, slightly greater than the initial beam diameter $\tau_o$.

The focal length f of the focusing mirrors 20 and 22 may be determined from:

$$f = \tau/\phi_o. \quad (3)$$

The scan angle $\theta$ over which the mirror 18 is rotated is related to the scan width W and the focal length f by:

$$\theta = (2W/f). \quad (4)$$

As a specific example for illustrative purposes, an arrangement according to FIG. 1 for the frequency doubling of a 1.06 μm laser beam may be constructed using the specific exemplary parameter values listed below in Table I. These values pertain to a cw-pound, Q-switched Nd:YAG laser 10 and a lithium-rich lithium niobate crystal 14. It should be understood, however, that numerous other lasers, crystals and parameter values are also appropriate and may be employed.

TABLE I

P = 150 watts
$\rho_o = 2 \times 10^5$ watts per cm
$\tau_o = 5$ mm
$\tau = 1$ mm
$\phi_o = 8$ mrad.
$\eta = 0.01$ cm$^{-1}$
K = 0.038 watts per cm$^2$
$\delta T = 0.6°$ C.
W = 1 cm
f = 12.5 cm
$\theta = 0.16$ rad.

Figure 2:
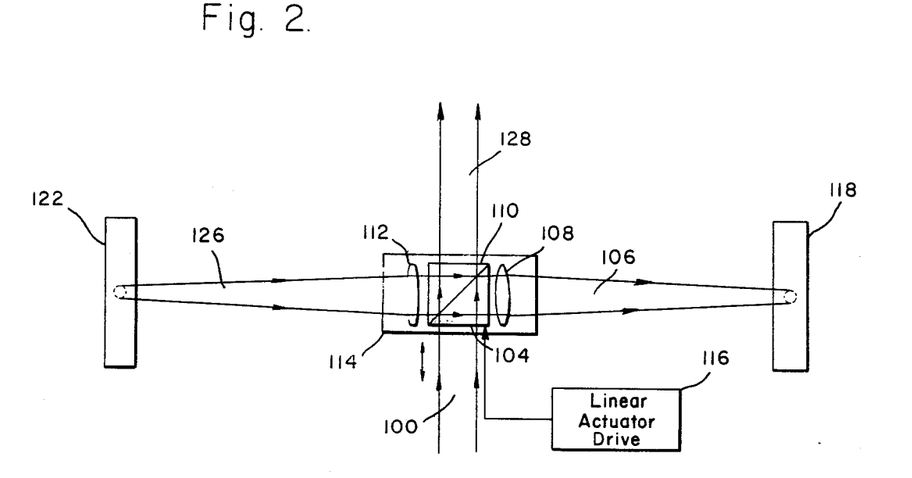
FIG. 2 is a plan schematic illustration of a scanning arrangement according to another embodiment of the invention.
Figure 3:
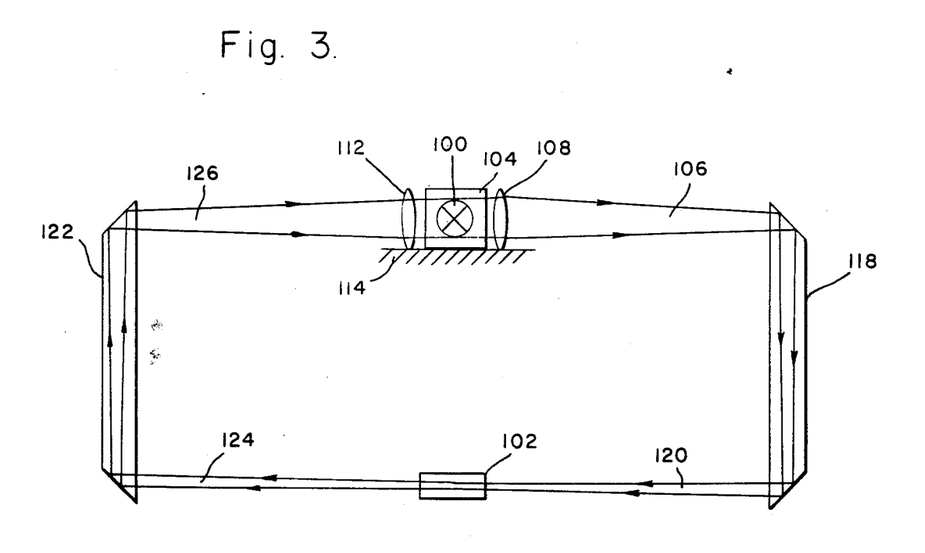
FIG. 3 is an end view of the arrangement shown in FIG. 2.

In an alternative embodiment of the invention, illustrated in FIGS. 2 and 3, a linearly moveable prism and lens array is employed to produce reciprocative scanning of the waist portion of a focused input laser beam 100 across the input surface of an optical signal converting crystal 102. As shown in FIGS. 2 and 3, input laser beam 100 is reflected by a totally reflecting right triangular prism 104 into a path 106 along a direction at an angle of 90° with respect to the path of the input beam 100. A converging lens 108 is disposed adjacent to the output face of the prism 104 to cause the laser beam propagating along path 106 to converge to its waist portion at the crystal 102.

A second right triangular prism 110 similar to the prism 104 is disposed with its hypotenuse face adjacent to the hypotenuse face of the prism 104 such that the prisms 104 and 110 together form a substantially cubic configuration. A converging lens 112 similar to the lens 108 is disposed adjacent to the opposite side of the substantially cubic configuration formed by the prisms 104 and 110 from the lens 108 and is aligned with the lens 108. The prisms 104 and 110 and the lenses 108 and 112 are mounted on a support member 114 which is moveable along a direction parallel to the path of the input laser beam 100. The support 114 is moved back and forth along this direction by a linear actuator drive 116.

A totally reflecting prism 118 is disposed to reflect the laser beam propagating along the path 106 into a path 120 toward the input surface of the crystal 102. A further totally reflecting prism 122 similar to the prism 118 is disposed on the opposite side of the crystal 102 and is oriented so that the laser beam emerging from the crystal 102 along path 124 is reflected into path 126 toward the lens 112 and the prism 110. After passing through the lens 112, the beam propagating along path 126 is reflected by prism 110 to provide an output laser beam along a stationary path 128 parallel to and substantially continuous with the path of the input beam 100.

It is pointed out that although prisms 104, 110, 118 and 122 are shown in the embodiment of FIGS. 2-3 for purposes of illustration, other reflective elements such as plane mirrors disposed at 45° angles with respect to the respective beams incident threeon may be employed instead. Or, as a further alternative, focusing reflectors such as concave mirrors 20 and 22 of FIG. 1 may be used instead of the prism-lens combinations 104-108 and 110-112. Moreover, in order to maintain the crystal 102 at the proper operating temperature for maximum efficiency frequency conversion, the crystal 102 should be housed in an appropriate oven (not shown in FIGS. 2 and 3 for the sake of clarity).

Figure 4:
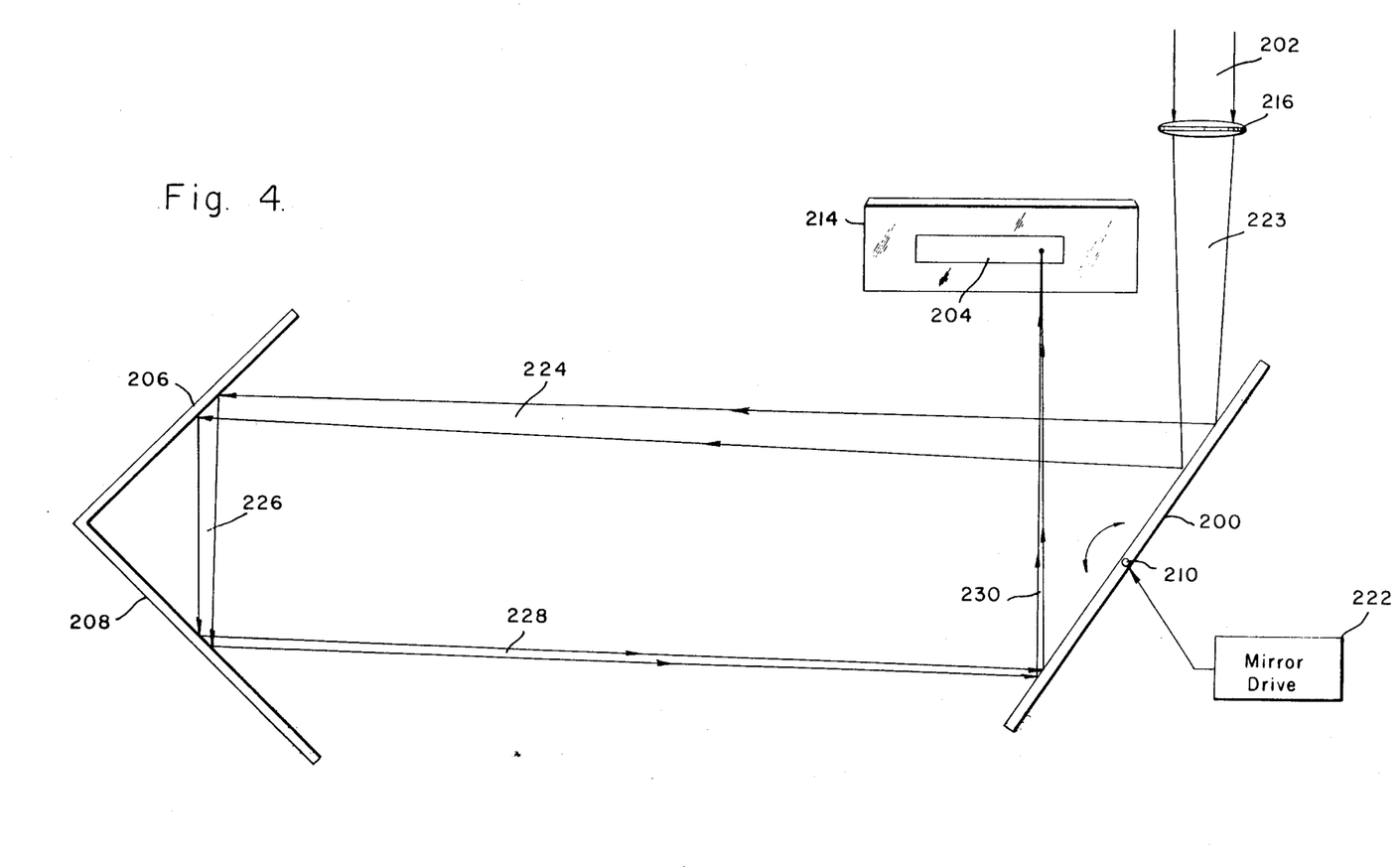
FIG. 4 is a plan schematic illustration of a scanning arrangement according to a further embodiment of the invention.
Figure 5:
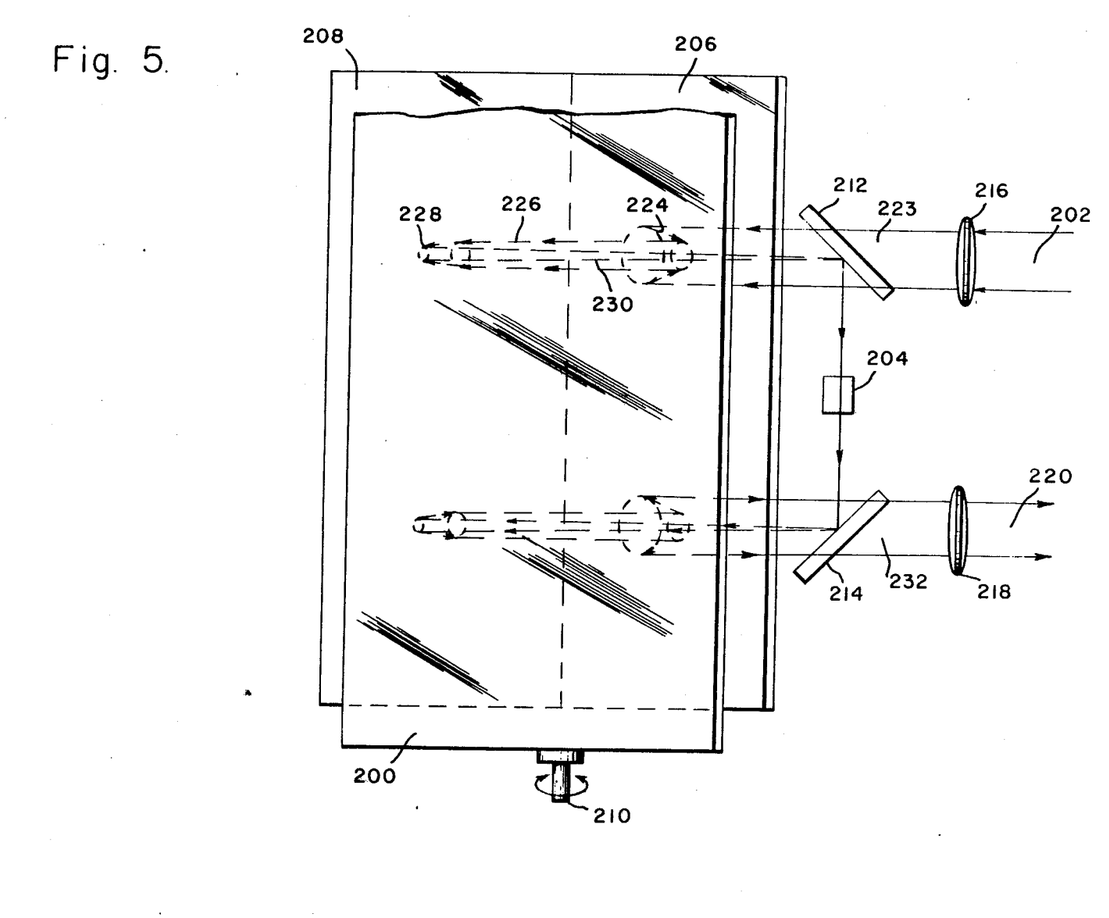
FIG. 5 is a side view of the arrangement shown in FIG. 4.
Figure 6:
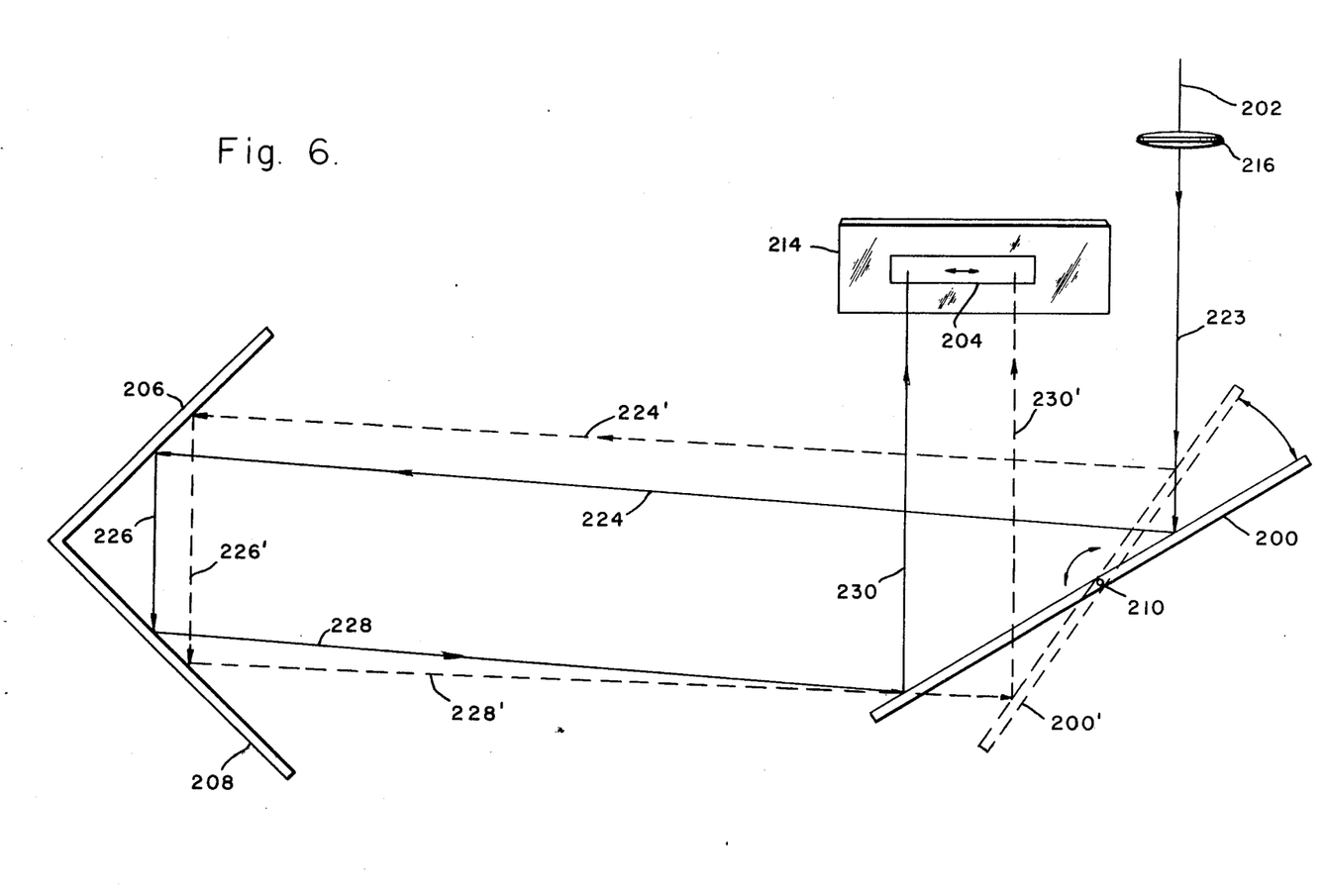
FIG. 6 is a plan schematic illustration of the arrangement of FIG. 4 showing simplified light beam paths for two different scanning positions.

In the operation of the embodiment of FIGS. 2 and 3, the input laser beam 100 is caused to propagate along path 106-120 to the input surface of the crystal 102, with the lens 108 focusing the beam to its waist portion at the crystal 102. After emerging from the crystal 102, the beam propagates along path 124-126 to the prism 110, from which it is reflected to form the output beam along path 128. As the assembly comprising the prisms 104 and 110 and the lenses 108 and 112 is moved back and forth under control of the linear actuator drive 116, the waist portion of the beam propagating through the arrangement is caused to reciprocatively scan the input surface of the crystal 102. After emerging from the crystal 102, the moving beam is effectively "descanned" to produce an output beam along stationary path 128. In a further embodiment of the invention, illustrated in FIGS. 4, 5 and 6, a reflector array including an oscillating scanning mirror 200 is employed to produce reciprocative scanning of the waist portion of a focused input laser beam 202 across the input surface of an optical signal converting crystal 204. In the arrangement of FIGS. 4-6, a pair of intersecting plane mirrors 206 and 208 longitudinally spaced from the scanning mirror 200 are disposed at an angle of 90° with respect to one another with their respective reflective surfaces facing the scanning mirror 200, and with their intersection line disposed parallel to axis of rotation 210 of the mirror 200.

The crystal 204 is disposed in a position facing the scanning mirror 200 and laterally spaced therefrom at a vertical location substantially midway along the height of the scanning mirror 200 (see FIG. 5). A plane mirror 212 disposed above the crystal 204 has its reflective surface facing the scanning mirror 200 and the crystal 204 so that a light beam from the scanning mirror 200 which impinges upon the mirror 212 is reflected downwardly to the crystal 204. A further plane mirror 214 is similarly positioned below the crystal 204 to reflect light emerging from the crystal 204 back to the scanning mirror 200. A converging lens 216 is disposed in the path of the input laser beam 202 to cause the beam propagating through the arrangement of FIGS. 4-6 to converge to a waist portion at the crystal 204 along a path to be described in detail below. A similar converging lens 218 is disposed in the path of the beam emerging from the arrangement to provide a parallel output beam 220.

A mirror drive 222, which may be similar to the mirror drive 26 of the embodiment of FIG. 1, rotates the scanning mirror 200 in an oscillatory manner over a small angle to cause the waist portion of the beam propagating through the arrangement to scan the input surface of the crystal 204 in the manner described more fully below. It is further pointed out that in order to maintain the crystal 204 at the proper operating temperature for maximum efficiency frequency conversion, the crystal 204 should be housed in an appropriate oven (not shown in FIGS. 4, 5 and 6 for the sake of clarity).

In the arrangement of FIGS. 4-6, after passing through the lens 216, the input laser beam 202 propagates along a converging folded path to the crystal 204. More specifically, the beam 202 first propagates along path 223 to a portion of the scanning mirror 200 from which it is reflected along path 224 toward the mirror 206. The beam is then reflected by mirror 206 into path 226 toward the mirror 208. After being reflected by the mirror 208, the beam propagates along path 228 back to another portion of the scanning mirror 200 from which it is reflected along path 230 toward the mirror 212. The beam is reflected downwardly from the mirror 212 (i.e., out of the plane of FIG. 4) toward the crystal 204. After passing through the crystal 204, the beam is reflected by mirror 214 back toward the scanning 200 in a plane parallel to and beneath the plane of FIG. 4. The beam then propagates in this lower plane in a direction opposite to that shown by the arrows in FIG. 4 for the aforedescribed converging path 223, 224, 226, 228 and 230 and along a diverging path directly beneath the path 223, 224, 226, 228 and 230. As shown in FIG. 5, after its last reflection from scanning mirror 200, the beam propagates along path 232 beneath the path 223 to the lens 218 from which it emerges as output beam 220.

Referring to FIG. 6 (wherein the beam propagation path through the arrangement is shown in single line for the sake of clarity), when the scanning mirror 200 is in the position shown in solid line, the beam propagation path to the crystal 204 is as shown in arrowed solid line, i.e., along path 224, 226, 228, and 230. When the scanning mirror 200 has been rotated to the position 200', shown in dashed line, the beam propagation path to the crystal 204 is as shown in arrowed dashed line, i.e., along path 224', 226', 228', 230'. Thus, it may be seen that as the scanning mirror 200 is reciprocatively rotated, the beam propagation path to the crystal 204 varies between that shown in solid line and that shown in dashed line, and the laser beam incident upon the crystal 204 is caused to reciprocatively scan the input surface of the crystal 204.

Although the invention has been shown and described with respect to particular embodiments, nevertheless, various changes and modifications which are obvious to a person skilled in the art to which the invention partains are deemed to lie within the spirit, scope and contemplation of the invention.

What is claimed is:

1. An optical frequency converting arrangement comprising:
an optical signal converting medium having an input surface and output surface for developing from a light beam at a first frequency incident upon said input surface a light beam at a second frequency emerging from said output surface;
means for directing an input light beam at said first frequency toward said input surface of said medium while causing said beam to converge to a portion of reduced cross-section at said medium; and means for producing relative movement between said reduced cross-section portion of said beam and said medium such that said portion of said beam is caused to effectively reciprocatively scan said input surface of said medium while deriving from said light beam emerging from said output surface of said medium an output light beam at said second frequency along a stationary path.

2. An arrangement according to claim 1 wherein said medium is a parametric optical signal converting medium for generating said light beam at said second frequency such that said second frequency is parametrically related to said first frequency.

3. An arrangement according to claim 2 wherein said second frequency is twice said first frequency.

4. An arrangement according to claim 2 wherein said medium is an electro-optic cystal.

5. An arrangement according to claim 4 wherein the extent of said scan across said input surface of said medium is not less than a distance W (measured in cm) given by $W = P\eta\tau/8K\delta T$, where P is the average power of said input light beam (measured in watts), $\eta$ is the absorption coefficient of said medium (measured in $cm^{-1}$), $\tau$ is the diameter of said reduced cross-section portion of said beam (measured in cm), K is the thermal conductivity of said medium (measured in watts per $cm-°C$.), and $\delta T$ is the acceptance temperature of said medium defined as the full-width, half-magnitude of the characteristic representing the power of said light beam at said second frequency emerging from said output surface of said medium as a function of temperature (measured in °C.).

6. An arrangement according to claim 1 wherein the last-named means includes reciprocatively moveable reflector means disposed in the path of said input light beam for causing said reduced cross-section portion of said beam to reciprocatively scan said input surface of said medium.

7. An optical frequency converting arrangement comprising:
an optical signal converting medium having an input surface and an output surface for developing from a light beam at a first frequency incident upon said input surface a light beam at a second frequency emerging from said output surface;
a first focusing reflector having a concave reflective surface of predetermined focal length facing said input surface of said medium and spaced from said medium by a distance substantially equal to said predetermined focal length;
a second focusing reflector having a concave reflective surface of said predetermined focal length facing said medium;
a scanning reflector having first and second reflective surfaces respectively facing the concave reflective surfaces of said first and second focusing reflectors and spaced therefrom by a distance substantially equal to said predetermined focal length, said first reflective surface being disposed in the path of an input light beam at said first frequency;
a further reflector having a reflective surface facing said output surface of said medium and said concave surface of said second reflector;
all of said reflective surfaces being disposed such than said input light beam is reflected sequentially from said first reflective surface of said scanning reflector and said concave reflective surface of said first reflector onto said input surface of said medium, and such that said light beam at said second frequency emerging from said output surface of said medium is reflected sequentially by said reflective surface of said further reflector, said concave reflective surface of said second focusing reflector, and said second reflective surface of said scanning reflector to form an output light beam;
and means for rotating said scanning reflector in an oscillatory manner whereby said input light beam is caused to reciprocatively scan said input surface of said medium while the path of said output light beam reflected from said second reflective surface of said scanning reflector remains stationary.

8. An arrangement according to claim 7 wherein said concave reflective surface of said first focusing reflector is disposed such that said input light beam impinges upon said input surface of said medium along a direction substantially perpendicular thereto.

9. An arrangement according to claim 7 wherein each of said concave reflective surfaces has the configuration of a spherical segment.

10. An arrangement according to claim 7 wherein said predetermined focal length is approximately equal to the quantity $\tau/\phi_o$, where $\phi_o$ is the intrinsic beam divergence of said input light beam and $\tau$ is the diameter of said input light beam adjacent to said input surface of said medium.

11. An optical frequency arrangement comprising:
an optical signal converting medium having an input surface and an output surface for developing from a light beam at a first frequency incident upon said input surface a light beam at a second frequency emerging from said output surface;
moveable reflective and focusing means for directing an input light beam at said first frequency propagating along a first path into a converging second path offset from said first path and for directing a light beam propagating along a diverging third path offset from said second path into a fourth path parallel to and substantially continuous with said first path to form an output light beam;
first stationary reflective means disposed optically between said moveable reflective and focusing means and said optical signal conveting medium for directing the light beam propagating along said second path toward said input surface of said medium;
second stationary reflective means disposed optically between said optical signal converting medium and said moveable reflective and focusing means for directing said light beam at said second frequency emerging from said output surface of said medium into said third path;
said moveable reflective and focusing means and said first and second stationary reflective means being disposed such that the light beam propagating along said first, second, third and fourth paths has a minimum cross-section at said medium; and
means for reciprocatively moving said moveable reflective and focusing means along a direction parallel to said first path whereby said input light beam is caused to reciprocatively scan said input surface of said medium while the path of said output light beam from said moveable reflective and focusing means remains stationary.

12. An optical frequency converting arrangement comprising:

an optical signal converting medium having an input surface and an output surface for developing from a light beam at a first frequency incident upon said input surface a light beam at a second frequency emerging from said output surface;

a scanning reflector facing said medium and mounted for rotational movement about a predetermined axis of rotation;

first and second reflector facing said scanning reflector and disposed at an angle of 90° with respect to one another, said first and second reflectors being oriented such that the respective planes passing therethrough intersect in a line parallel to said axis of rotation;

a third plane reflector facing said scanning reflector and said input surface of said medium;

a fourth plane reflector facing said scanning reflector and said output surface of said medium;

said first, second, third, fourth and scanning reflectors all being disposed such that said input light beam is reflected sequentially from said scanning reflector, said first reflector, said second reflector, said scanning reflector and said third reflector onto said input surface of said medium, and such that said light beam at said second frequency emerging from said output surface of said medium is reflected sequentially by said fourth reflector, said scanning reflector, said second reflector, said first reflector and said scanning reflector to form an output light beam;

focusing means disposed in the path of said input and output light beams for focusing said beams such that a beam of minimum cross-section is produced at said medium; and means for rotating said scanning reflector in an oscillatory manner about said axis of rotation whereby said input light beam is caused to reciprocatively scan said input surface of said medium while the path of said output light beam remains stationary.

* * * * *